(12) United States Patent
Hunter, Jr. et al.

(10) Patent No.: US 10,222,178 B1
(45) Date of Patent: *Mar. 5, 2019

(54) PRECISION GEOGRAPHIC LOCATION SYSTEM AND METHOD UTILIZING AN IMAGE PRODUCT

(71) Applicant: Litel Instruments, San Diego, CA (US)

(72) Inventors: Robert O. Hunter, Jr., Snowmass Village, CO (US); Adlai H. Smith, Escondido, CA (US)

(73) Assignee: LITEL INSTRUMENTS, San Diego, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/791,054

(22) Filed: Jul. 2, 2015

Related U.S. Application Data

(63) Continuation of application No. 13/443,684, filed on Apr. 10, 2012, now Pat. No. 9,074,848.
(Continued)

(51) Int. Cl.
*F41G 7/34* (2006.01)
*G06T 7/11* (2017.01)
(Continued)

(52) U.S. Cl.
CPC .......... *F41G 7/346* (2013.01); *G01S 13/9005* (2013.01); *G01S 19/48* (2013.01);
(Continued)

(58) Field of Classification Search
CPC .......... G01S 13/88; G01S 13/89; G01S 13/90; G01S 19/38; G01S 19/39; G01S 19/42; G01S 19/48; G01S 19/01; G01S 19/13; G01S 19/21; G01S 7/04; G01S 7/10; G06G 7/48; G06G 7/80; G06T 7/0002; G06T 7/0004; G06T 7/001; G06T 3/00; G06T 7/20; G06T 7/30; G06T 7/32; G06T 7/70; G06T 7/73; G06T 7/74; G06T 7/0079; G06T 7/254; G06T 7/11; F41G 7/34; F41G 7/343; F41G 7/346; G06K 9/00624; G06K 9/00791; G06K 9/00798; G06K 9/20
See application file for complete search history.

(56) References Cited

U.S. PATENT DOCUMENTS 3,680,086 A * 7/1972 Valstar ...................... G01S 7/10
342/158
3,737,120 A 6/1973 Green
(Continued)

OTHER PUBLICATIONS

The GPS System, Kowoma.de, Apr. 19, 2009, 2 pages.

*Primary Examiner* — Bernarr E Gregory
(74) *Attorney, Agent, or Firm* — Foley & Lardner LLP

(57) ABSTRACT

A method of mapping a target region image to a referenced image includes steps of acquiring the target region image. The method also includes acquiring the referenced image overlapping the target region image. The method further includes determining a number of common subregions in an intersection of the referenced image and the target region image, determining offsets between the common subregions, computing a distortion map of the target region image over the intersection, and remapping the target region image to match the reference image. The method can be utilized in a Unmanned Aerial Vehicle (UAV) and the target image can be a SAR image.

20 Claims, 10 Drawing Sheets

Related U.S. Application Data

(60) Provisional application No. 61/517,141, filed on Apr. 13, 2011.

(51) Int. Cl.
  *G06T 7/00* (2017.01)
  *G01S 13/90* (2006.01)
  *G01S 19/48* (2010.01)
  *G06G 7/80* (2006.01)

(52) U.S. Cl.
  CPC .............. *G06G 7/80* (2013.01); *G06T 7/001* (2013.01); *G06T 7/0081* (2013.01); *G06T 7/11* (2017.01)

(56) References Cited

U.S. PATENT DOCUMENTS

| | | | |
|---|---|---|---|
| 3,740,747 A | 6/1973 | Hance et al. | |
| 3,808,596 A * | 4/1974 | Kazel | G01S 7/04 250/334 |
| 4,133,004 A | 1/1979 | Fitts | |
| 4,162,775 A | 7/1979 | Voles | |
| 4,476,494 A | 10/1984 | Tugaye | |
| 4,490,719 A | 12/1984 | Botwin et al. | |
| 4,771,287 A | 9/1988 | Mims | |
| 4,975,704 A | 12/1990 | Gabriel et al. | |
| 4,993,662 A | 2/1991 | Barnes et al. | |
| 5,018,218 A | 5/1991 | Peregrim et al. | |
| 5,213,281 A | 5/1993 | McWilliams et al. | |
| 5,289,993 A | 3/1994 | McWilliams et al. | |
| 5,309,522 A | 5/1994 | Dye | |
| 5,606,627 A | 2/1997 | Kuo | |
| 5,626,311 A | 5/1997 | Smith et al. | |
| 5,644,386 A | 7/1997 | Jenkins et al. | |
| 5,647,015 A | 7/1997 | Choate et al. | |
| 5,884,219 A | 3/1999 | Curtwright et al. | |
| 6,031,568 A * | 2/2000 | Wakitani | G06T 7/20 348/169 |
| 6,654,690 B2 | 11/2003 | Rahmes et al. | |
| 6,707,464 B2 | 3/2004 | Ham et al. | |
| 6,898,332 B2 | 5/2005 | Matsuhira | |
| 7,301,568 B2 * | 11/2007 | Smith | G06T 3/00 348/231.3 |
| 7,408,629 B2 | 8/2008 | Qwarfort et al. | |
| 7,567,694 B2 | 7/2009 | Lu et al. | |
| 8,345,979 B2 * | 1/2013 | Davis | G06T 7/0079 382/181 |
| 9,074,848 B1 * | 7/2015 | Hunter, Jr. | G01S 13/90 |
| 2004/0041999 A1 * | 3/2004 | Hogan | G06T 7/74 356/141.5 |
| 2005/0018904 A1 * | 1/2005 | Davis | G06T 7/0079 382/181 |
| 2006/0072843 A1 * | 4/2006 | Johnston | G06K 9/20 382/254 |
| 2006/0098861 A1 * | 5/2006 | See | G06T 7/32 382/145 |
| 2006/0293854 A1 * | 12/2006 | Chiou | G01S 19/21 701/301 |
| 2008/0177427 A1 | 7/2008 | Marty et al. | |
| 2008/0314234 A1 * | 12/2008 | Boyd | G06T 7/254 89/1.11 |
| 2010/0254612 A1 * | 10/2010 | Oldroyd | G06T 7/30 382/209 |
| 2011/0044543 A1 * | 2/2011 | Nakamura | G06K 9/00798 382/190 |

* cited by examiner

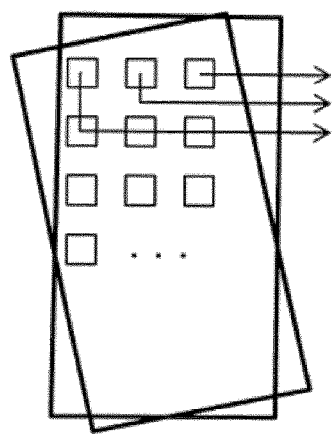
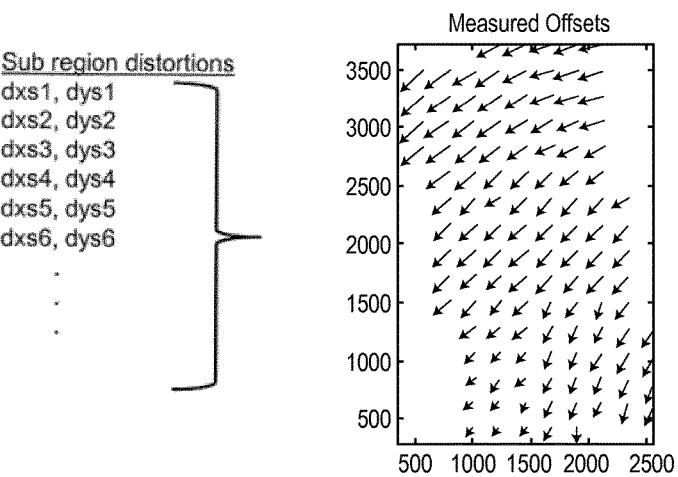
FIG. 7A    FIG. 7B    FIG. 7C
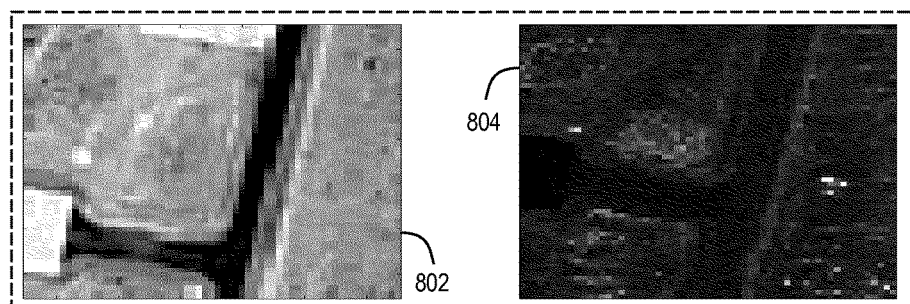
FIG. 8
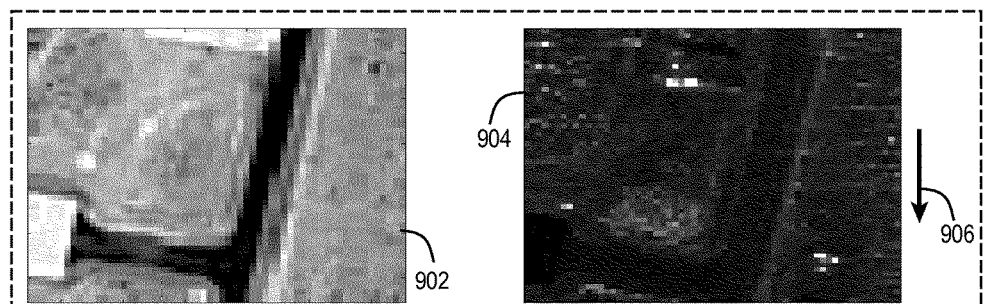
FIG. 9

PRECISION GEOGRAPHIC LOCATION SYSTEM AND METHOD UTILIZING AN IMAGE PRODUCT

CROSS-REFERENCE TO RELATED PATENT APPLICATIONS

The present application is a continuation of U.S. patent application Ser. No. 13/443,684, filed on Apr. 10, 2012, now U.S. Pat. No. 9,074,848, which claims the benefit of and priority to U.S. Provisional Application Ser. No. 61/517,141, filed Apr. 13, 2011, both of which are incorporated by reference in their entireties and for all purposes.

BACKGROUND

The present specification generally relates to systems for and methods of increasing the location accuracy (e.g., geographic location accuracy). More particularly, the present specification relates to increasing location and/or targeting accuracy using an image product.

It is desirable to increase location and/or targeting accuracy in a variety of systems. An example of a system that could benefit from increased location and/or targeting accuracy is a system that uses a synthetic aperture radar or other battlefield image products.

Military planners and campaigners heretofore have not achieved the full capacity of airborne synthetic aperture radar (SAR) implemented on unmanned aerial vehicles (UAV). One large advantage of UAV SAR systems in a tactical environment is their relatively low cost, flexibility of deployment, useful resolution (~0.25 m), and all weather and day/night imaging capability. A significant disadvantage of UAV SAR systems is lower geographic location accuracy of targets within their field of view.

One measure of munition capability is the circular error probable (CEP) or radius from the mean impact location it lands 50% of the time. R95 is a factor proportional to CEP and represents the radius from the mean landed in 95% of the time. These are measures of munition repeatability. Kill radius (Rk) sets the combined munition/target area in which the designated target is destroyed if it lands within this area. For hard targets (tanks, bunkers, etc), Rk is a strong function of position on the target. Target 'soft spots' have larger Rk values while physically missing the target aim point by much at all leads to a zero kill radius (Rk=0).

For a soft target (unarmored vehicle, standard building, antenna, etc), Rk is a very weak function of position. FIG. 1 shows Rt/R95 v. Rk/R95 where targeting inaccuracy Rt=offset of mean landing point of munition from intended position, is achieved. A curve 1 in FIG. 1 describes the ability to destroy targets. Rt is the maximum allowed targeting error to destroy a soft target for a given kill radius Rk. Both axes in FIG. 1 are scaled by the munition repeatability, R95.

The plot of curve 1 is largely linear with Rt/R95~Rk/R95−0.83 for Rk/R95>1.2. Since soft targets are usually destroyed by energetic shrapnel whose energy incident on a unit area ~$1/R^2$, the minimum munition weight is ~$Rk^2$.

FIG. 2A shows the munition weight required for a given targeting error (W(Rt)) relative to the weight for zero targeting error (W(0)). For a targeting error (Rf) equal to half of the munition R95 (Rt/R95=0.5), the weight is 60% more than minimum weight but a targeting error double the R95 (Rt/R95=2) requires 640% over the minimum as shown by the plot of curve 2. The ability to effectively attack targets with lighter munitions means a given weapons platform (e.g., missile carrying drone) can carry a greater number of munitions and potentially destroy a greater number of targets.

Munitions designed for attacking hard targets generally penetrate the target to some depth followed by an explosion. To accomplish this, the munition must land within some distance (Rs) from the soft spot and no further away. Increasing the explosive power does not by much increase Rs. In this case, the maximum allowed targeting error (Rt) relative to R95 is still given by curve 1 in FIG. 1 only the x-axis scale is interpreted as Rs/R95 instead of Rk/R95. In all cases, Rt<Rs meaning the targeting error must be less than the target size (soft spot size) if the target is to be successfully destroyed.

If targeting capability limits the ability to achieve high kill probabilities, multiple munitions per target can be launched. However, launching multiple munitions per target is costly. The targeting probability can be taken as uniform within a circle of radius Rt centered on the aim point and the size of the target soft spot is Rs. Plots of curves 3, 4, 5 and 6 in FIG. 2B show the maximum targeting error for a given number of munitions (nmun) required to hit a hard target within its soft spot. As an example, a target with a soft spot twice the size of the munition repeatability (Rs/R95=2) can be hit using a single munition (nmun=1) with 95% probability if the maximum targeting error is <=1.6*R95 but if the targeting error exceeds 2.75*R95, over 4 munitions (nmun=4) are required for the same probability of success. Most of the advantage of using multiple munitions can be obtained with nmun=2; the returns rapidly diminish beyond this as shown by curves 3, 4, 5 and 6. The ability to significantly increase targeting accuracy (decrease Rt) leads to fewer instances where multiple munitions are required to destroy a designated target.

Submeter accuracy today is generally achieved by active man-in-the-loop continuous adjustment ("joy sticking") of the munition trajectory. This requires personnel and aircraft to remain in the proximity of the munition drop off point. Achieving high Pk's (kill probabilities) in this manner places high value assets (aircraft and personnel) at greater risk than attacking from a larger standoff distance and immediately leaving the munition drop off point. A further drawback of joy sticking for accuracy is that a single munition requires the full attention of the bombardier for the duration of the drop (~1 minute). This precludes attacking multiple targets in parallel with the same high precision.

Thus, there is a need to increase targeting and/or location accuracy. There is also a need to increase targeting accuracy for a UAV. There is also a need for a UAV SAR with greater geographic accuracy. There is further a need for precision target geographic location utilizing a lower accuracy immediate image product. There is a further need for improving aircraft navigational fix using an image product for location determination. There is further a need for a system and method of increasing location or targeting accuracy using a remapping technique.

SUMMARY OF INVENTION

An exemplary embodiment relates to a method of mapping a target region image to a referenced image. The method includes steps of acquiring the target region image and acquiring the referenced image overlapping the target region image. The method further includes determining a number of common subregions in an intersection of the referenced image and the target region image, determining offsets between the common subregions, computing a distortion map of the target region image over the intersection, and remapping the target region image to match the reference image.

Another exemplary embodiment relates to a method for improving target accuracy of a GPS guided munition. The method includes acquiring a firing station image and precisely locating firing and placement locations using a remapped image. The method further includes acquiring GPS locations of the firing emplacements, and using a difference from the firing emplacement locations and the GPS locations to correct targeting.

Yet another exemplary embodiment relates to a method of improving a navigational position fix for an aerial platform. The method includes acquiring a ground image using sensors imbedded on the aerial platform. The method also includes recording navigational telemetry and other flight information including a GPS signal, locating the ground image using a remapped image, and locating the aerial platform using the ground image. The method also includes correcting the in situ navigational data of the aerial platform using information gained in the locating steps.

Still another exemplary embodiment relates to a method precisely targeting a munition. The method includes acquiring a firing image station image, precisely locating firing emplacement locations using a remapped image technique, transmitting the firing emplacement locations to firing control, acquiring a target image, and locating targets within the target image using the remapped image technique. The method also includes transmitting the firing emplacement locations to firing control and releasing munitions utilizing the emplacement locations and the target locations.

BRIEF DESCRIPTION OF THE DRAWINGS

Exemplary embodiments will be described hereafter with reference to the accompanying drawings, wherein like numerals denote like elements, and:

FIG. 7A is a drawing of an overlay of the target and referenced image outlines with common subregions in accordance with an exemplary embodiment;

FIG. 7B is an illustration of computed subregion offsets in accordance with an exemplary embodiment;

FIG. 7C is a drawing of a vector map of measured subregion distortions in accordance with an exemplary embodiment;

FIG. 8 is a drawing showing a referenced image subregion and a target image subregion before alignment;

FIG. 9 is a drawing showing the referenced image subregion and target image subregion after alignment in accordance with another exemplary embodiment;

FIG. 11 is a drawing showing an example of a non-rectangular subregion not aligned with coordinate system ie, in;

DETAILED DESCRIPTION OF EXEMPLARY EMBODIMENTS

By improving targeting, and/or location accuracy, the method and system disclosed herein enables the advantageous tactics of multiple targeting at greater standoff distances with less time spent in high danger zones in one embodiment. Although described below with respect to UAV and targeting applications, the method and systems described herein can be utilized in a variety of targeting, location, navigational, and control applications without departing from the scope of the invention. The methods disclosed herein can be implemented using a computer system or other electronic hardware implementing the steps disclosed herein as routines, instructions or other computer commands.

Taken by themselves, typical SAR errors can be ~5 m which is generally not useful for most hard targets (Rs~1m) and for soft targets requires larger munitions and associated collateral damage. A remapping technique for target location that significantly reduces these geographic location errors can be achieved as disclosed herein in one embodiment. In one embodiment, one of the consequences of such a technique are increasing the effective range of inertially guided munitions and improving the performance of seeker munitions by narrowing their required field of regard, thus reducing terminal target misidentification/confusion.

While errors in UAV SAR imagery are large for many targeting purposes, the ability to transmit timely, all condition, engagement theatre imagery provides reason to use UAV SAR systems. To usefully improve the accuracy of SAR imagery, subregions of the SAR image are correlated with a reference image of known accuracy in one embodiment. The SAR image is shifted and possibly undistorted to match the reference image in one embodiment. The resulting remapped SAR image shares the same accuracy as the reference image to within the limits of remapping in one embodiment.

Figure 1:
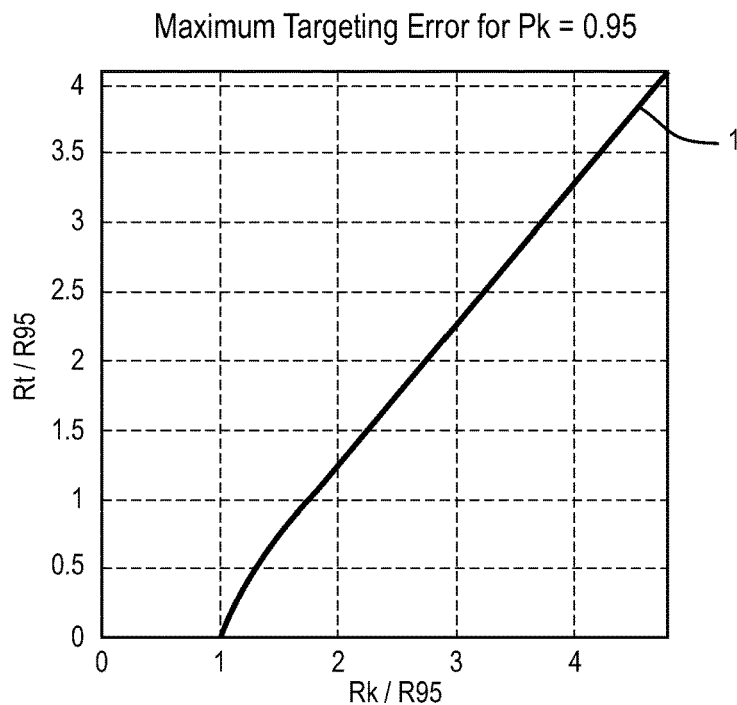
FIG. 1 is a chart illustrating maximum allowed targeting error (Rt) for a given munition kill radius (Rk) normalized by R95.
Figure 2A:
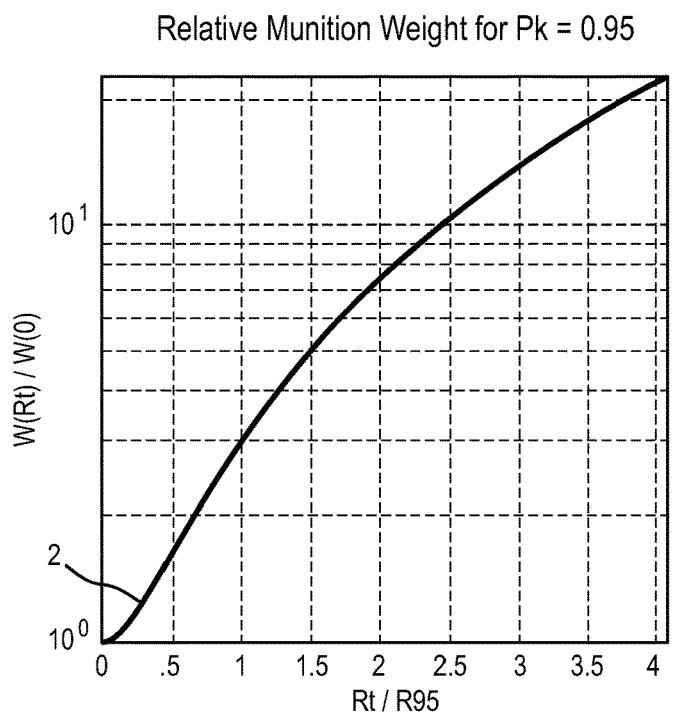
FIG. 2A is a chart illustrating minimum munition weight relative to weight required with zero targeting error normalized by R95.
Figure 2B:
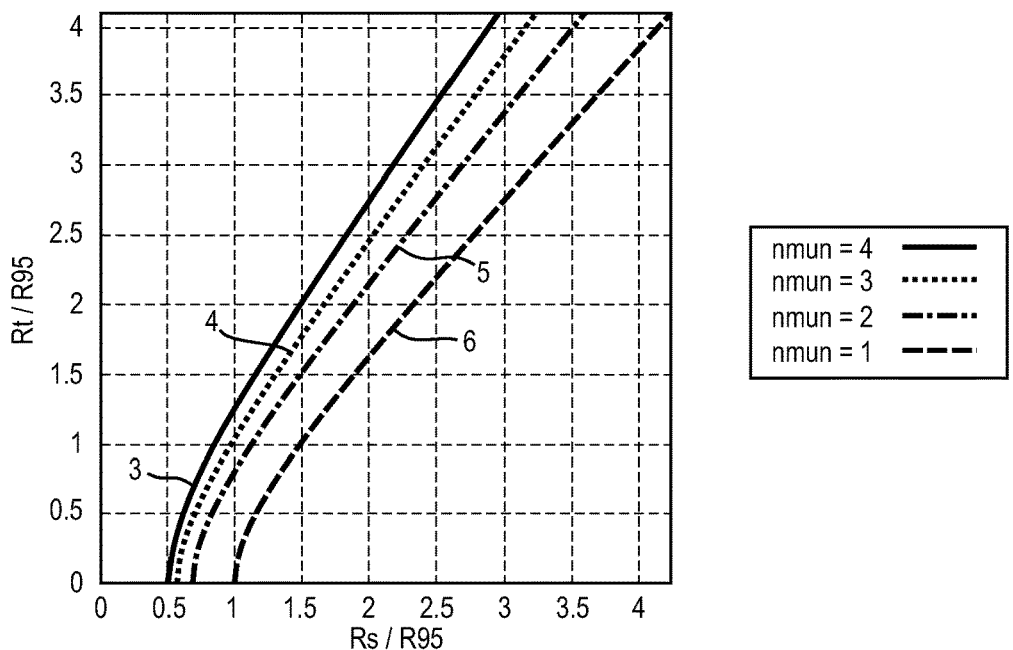
FIG. 2B is a chart illustrating maximum targeting error for destroying a hard target using multiple munitions normalized by R95.
Figure 3:
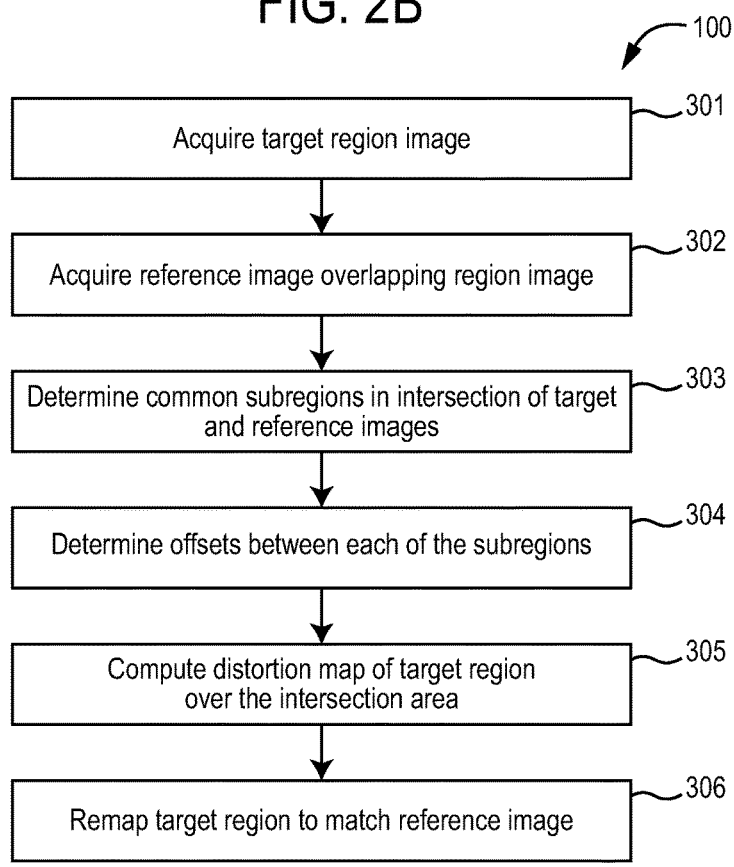
FIG. 3 is a flow diagram showing a method of targeting or locating in accordance with one exemplary embodiment.

With reference to FIG. 3, a targeting or locating method 100 is shown according to one embodiment. Method 100 can be performed on a computing platform configured with software stored on a non-transitory medium. Method 100 can be performed on a single computing platform, multiple computing platforms. a central computing platform in communication with other platforms. Method 100 can be performed as a networked application. Although described as a targeting method, method 100 can be utilized for other purposes including navigation, control, location, etc.

Acquire Target Region Image

Method 100 includes an acquire target region step 301. At step 301, the SAR image product (target image) of the region where there are potential targets is acquired from a UAV, satellite or other platform. The image can be received and stored in a computer system. The target image may contain Target Region Image known geometric distortions which are removed either before or as part of the subsequent processing in one embodiment.

In the case of spotlight SAR imagery, this distortion includes key stoning and remapping from the native slant plane to the ground plane (local tangent plane to the earth). For satellite based SAR maps with known antenna pointing errors, these errors would be corrected for in this step in one embodiment while for optical imagery, standard perspective corrections are applied in one embodiment. For other image acquisition technologies, the appropriate correction can be applied. After transforming to the ground plane (local tangent to earth surface), an image is provided which is described by a generalized amplitude, A(ie,in), that is defined over a usually polygonal region (support region) with ie, in the east, north direction pixel indices representing points dpix (meters) apart and running over ranges ie=1:ne, in=1:nn representing an image with ne*nn total pixels according to one embodiment.

Meaning of generalized amplitude can depend on the acquisition technology, being the return amplitude (presumably range corrected) for a SAR system, a grayscale or R/G/B color intensity in an optical image, a grayscale intensity in an infrared system, etc. The target image possibly contains target objects (targets) that are intended to be attacked and requires prompt evaluation and processing (typically on the order of minutes) to be of major tactical utility. Thus, for targeted building or structures (static targets), the friend or foe presence dictates the time line for offensive action while vehicles, airplanes, armor, IED placement actions all represent transient targets that can possibly shift or move before action can unfold. In addition to the generalized image amplitude (which is referred to as amplitude when no confusion can arise as to its meaning) and the support region, a nominal geographic location (latitude, longitude) is also conveyed by the imaging platform (UAV, satellite, etc. for example) in one embodiment.

Figure 10:
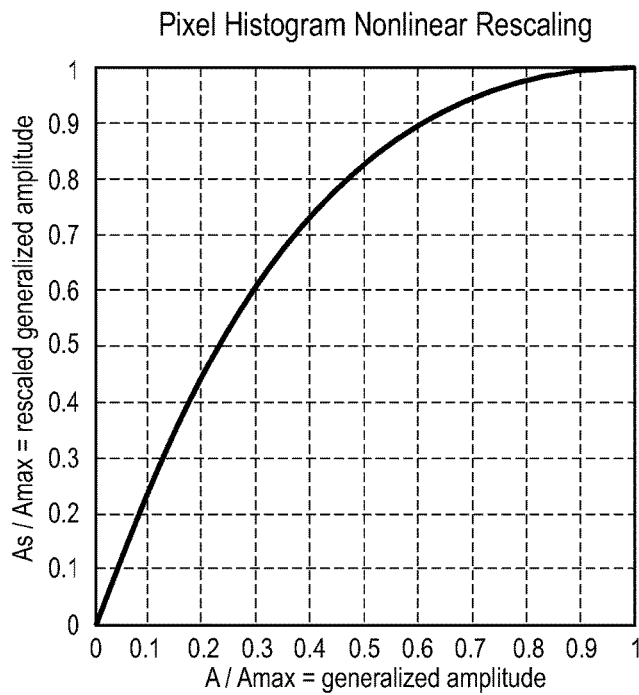
FIG. 10 is a chart showing an example of a non-linear pixel rescaling function according to an exemplary embodiment.

Depending on the nature of the reference image, the pixel amplitudes, A, may be rescaled to improve the quality of the subsequent image matching steps. With reference to FIG. 10, the generalized target amplitude A when scaled by the maximum possible value, Amax, is transformed to the new amplitude, As (also scaled by Amax) in a non-linear fashion in one embodiment. In this example, the lower amplitude sections (like A/Amax=0:0.3) are stretched over a wider range (A/Amax=0:0.3->As/Amax=0:0.6) while the higher amplitude regions (like A/Amax=0.6:1) are compressed into a smaller portion of the amplitude range (A/Amax=0.6:1->As/Amax=0.9:1).

Figure 4:
FIG. 4 is an illustration of an SAR image product in ground plane for use as a target region image in the method illustrated in FIG. 4 in accordance with an exemplary embodiment.

With reference to FIG. 4, an exemplary SAR image product in the ground plane provides a target region image or target image. The target image is an SAR image while the reference image is an optical image in this example. A non-linear filter can be applied to reduce the amplitude of extremely bright pixels (glints) in one embodiment. Also, the slant plane and key stone distortions can be removed as shown in FIG. 4.

Acquire Reference Image

In step 302 of method 100, the reference image is acquired. The reference image is generally from a pre-stored image atlas encompassing the theatre of action and is quickly fetched up based on the target image nominal geographic location and extent. The reference image can be received and stored in a computer system. Again, the reference image consists of generalized amplitude A'(ie'=1:ne', in'=1:nn'), with support over a well defined region, with pixel size dpix', and a geographic location that is preferably the same as target geographic location but could be different. The reference image preferably significantly overlaps the target image over the region of interest (ROY) and preferably completely encompasses it. The reference image is preferably in the ground plane but if there are well defined geometrical distortions (vide supra) from a ground plane map, the distortions can be taken out as part of the acquisition process in one embodiment. A goal is targeting accuracy in the pixel (dpix) to sub pixel (<dpix) range. So the pixel size of this image (dpix') need be no smaller than dpix in one embodiment. This means either the image atlas can be stored in a greatly reduced data volume or before transmitting to the processor, the reference image can be down sampled (typically using a tapered local average with interpolation) to the required resolution in one embodiment. This provides an enormous savings in data transmission time. When the pixel size in the image atlas is dpix'>dpix (this is typical of commercial satellite imagery with dpix'=0.41 m, ref 1), no such down sampling is required. In this case, reference image could be interpolated to the dpix level or the target image down sampled to the dpix' level. Generally, when dpix<dpix'<2-4*dpix=dupix, the reference image is interpolated to dpix sized pixels using a quadratic spline over each dpix' pixel that preserves the total amplitude within each pixel and is continuous at the edges in one embodiment. Other interpolation schemes are possible and can be carried out either at a computer processor collocated with image atlas site or with the local processor as part of step 302. When dupix<=dpix', the target image is down sampled and interpolated to match the reference image pixel size dpix'.

Figure 5:
FIG. 5 is an illustration of a satellite image product for use as a reference image in the method illustrated in FIG. 3 in accordance with another exemplary embodiment.
Figure 6:
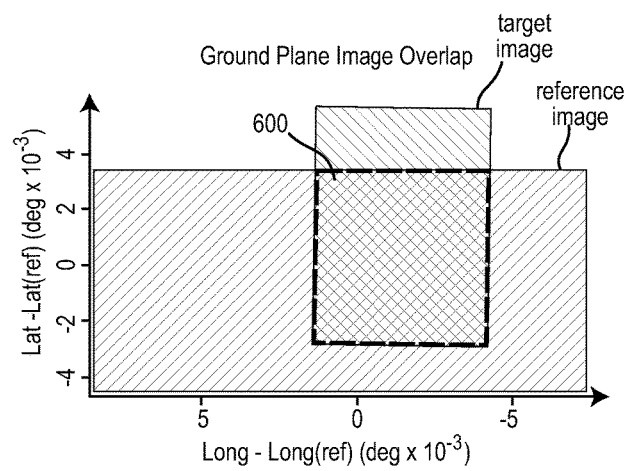
FIG. 6 is a drawing illustrating a nominal overlap of the SAR image product illustrated in FIG. 4 and the satellite image product illustrated in FIG. 5 in accordance with an exemplary embodiment.

As an example, FIG. 5 is a reference image (satellite) taken from Google maps with resolution dpix' ~3 m. Corresponding target image (FIG. 4) had resolution dpix<dpix' by enough of a margin that it was down sampled using a local tapered weight and interpolated onto a dpix' spaced grid. FIG. 6 shows the nominal overlap or intersection of the reference and target image regions.

At step 303 of FIG. 3A, the common subregions over the intersection of the target and reference images (intersection or intersection region) can be determined (e.g., in a computer system). FIG. 6 shows example of intersection region, I, (denoted by dashed lines) of reference and target images. FIG. 7A shows a further example with an array of common subregions picked out. In the example shown in FIG. 7A, the subregions are simply an array of rectangles at regular intervals that lie completely within the intersection. The size of subregions is determined by size of the sub image (nsi×nsi pixels^2) and the estimated maximum uncertainty in the overlay of the target and reference images (+/-nu pixels) as nsr×nsr pixels^2 where nsr>=nsi+2*nu. For example, if trying to match 31×31 sub images (nsi=31) and the estimated max uncertainty in overlay is 10 pixels (nu=10), then the subregions must be at least 51×51 pixels^2 in size (nsr>=nsi+2*nu=31+2*10=51). The uncertainty, nu, used in the subsequent calculations should always be at least 1 (nu>=1) to allow us to get sub pixel overlay resolution. Overestimating nu slows down the computation and can limit the number of possible subregions by making nsr to large. The offset calculation (vide infra) can be done in stages the first stage being getting an approximate net translation offset between target and reference images in one embodiment. In this example, nu is chosen to a value consistent with the worst offsets typically encountered in specific experiences or could be initially set at a user interface stage where a single corresponding feature in each is humanly designated through a graphical user interface and this or a multiple (>1) thereof is used for nu. Having an initial match over a single subregion (computed offset=dxs1, dys2), an actual error nu'=max(|dxs1|, |dys1|) exists and 3 or more features offset from the first one can be examined, preshifted by the estimate of gross translation error, (dxs1, dys1), and with nu=nu' or possibly nu'/2 in one embodiment. Having a number of offsets (dxs1,dys1), . . . (dxsn, dysn) (n>=4), the offset can be fit to a simple linear form in one embodiment:

$$(dx,dy)(ie',in')=(tx+dx/die'*(ie'-<ie'>)+dx/din'*(in'-<in'>),$$

$$ty+dy/die'*(ie'-<ie'>)+dy/din'*(in'-<in'>)) \quad (eq\ 1)$$

where:
(dx, dy)(ie', in')=estimated offset of target subregion nominally centered at (ie', in')=east, north pixel indices
<ie'>, <in'>=average value of ie', in' indices over intersection
tx, ty, dx/die', dy/die', dx/din', dy/din'=constants determined by least squares fit to the measured offsets (dxs1, dys1, . . . dxsn, dysn).

From the residuals (differences between measured offsets and eq 1), an updated estimate for nu is obtained which can be used in choosing our subregion sizes provided the subregion are offset according to eq 1 in one embodiment. Proceeding in this manner, it is clear the value of nu and the size of subregions evolves over the course of the calculation in one embodiment.

Figure 11:
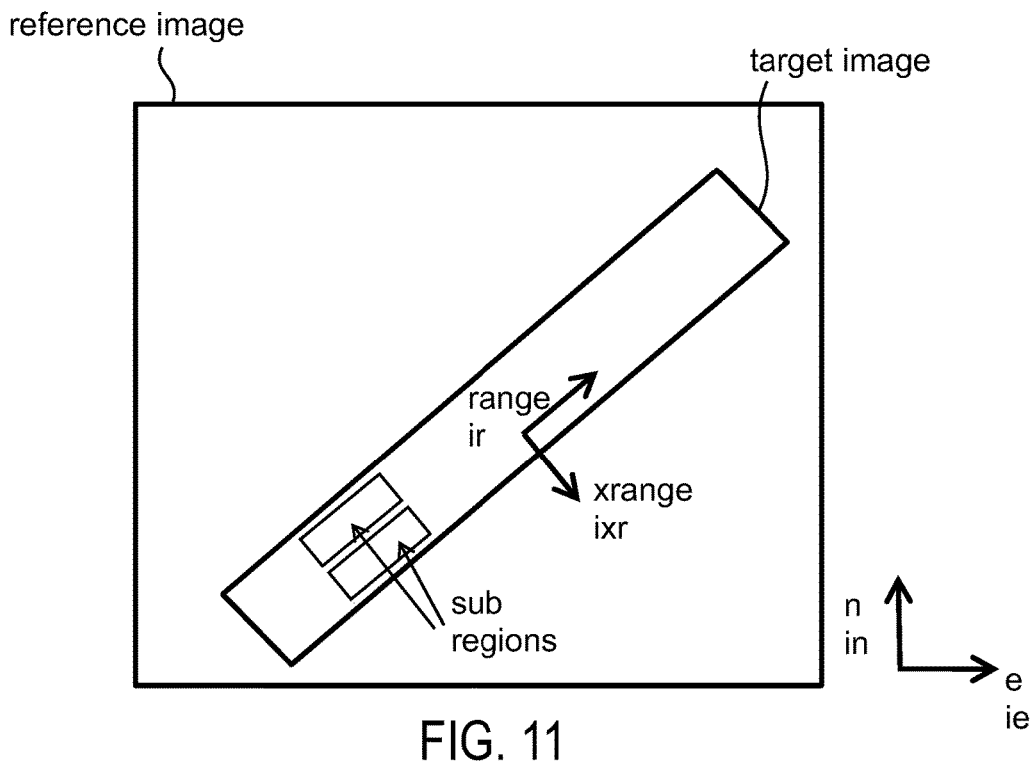

The subregions need not be square and aligned with the east-north axes, this is mainly for illustration. More typically, the situation illustrated in FIG. 11 exists where a target image is completely covered by a reference image, the target image outline being significantly rotated with respect to east-north axes (e,n) and also having an aspect ratio >~2. This is typical of much spotlight and strip map SAR image product which is larger in the range direction compared to the cross range (xrange). In step 302, a computer system (either at the local processor or the processer associated with the image atlas) can change coordinates of the reference to range (ir in pixels) and xrange (ixr in pixels). Subregions would then be rectangles with sides parallel to these axes.

Determine Offsets Between Subregions

In step 304 (FIG. 3), the offset between the subregions is determined. Typically the reference image entirely overlaps the target image (FIG. 11) so the square of the correlation coefficient is maximized:

$$R2(dx,dy)=<(A(x+xc,y+yc)-<A>)*(A'(x+xc+sx+dx,y+yc+sy+dy)-<A'>)>^2/\sigma^2_A\sigma^2_{A'}, \quad (eq\ 2)$$

where:
A, A'=target, reference amplitude xc, yc=center of subregion we are considering in agreed coordinates ((range, xrange), (e,n), etc)
x, y=offset from center of sub region. These represent the pixels within the sub image and for a square subregion comprise an nsi×nsi array.
sx, sy=estimated offset of reference from target subregion. Gross translation (vide supra) or eq 1 are examples of where such an estimate comes from.
dx, dy=2*nu+1×2*nu+1 array of possible offsets.
< > denotes averaging over the nsi×nsi (x,y) values
<A>=average of A over the nsi×nsi array centered at (xc,yc)
<A'>=average of A' over the nsi×nsi array centered at (xc+sx+dx,yc+sy+dy)
$\sigma^2_A$, $\sigma^2_{A'}$=standard deviation of A, A' over same set of pixels as <A>, <A'> calculated.

The oversized (reference) image is shifted to maximize the number of offsets computed in one embodiment. Eq 2 could also be implemented with the roles of A and A' reversed in one embodiment.

Figure 12:
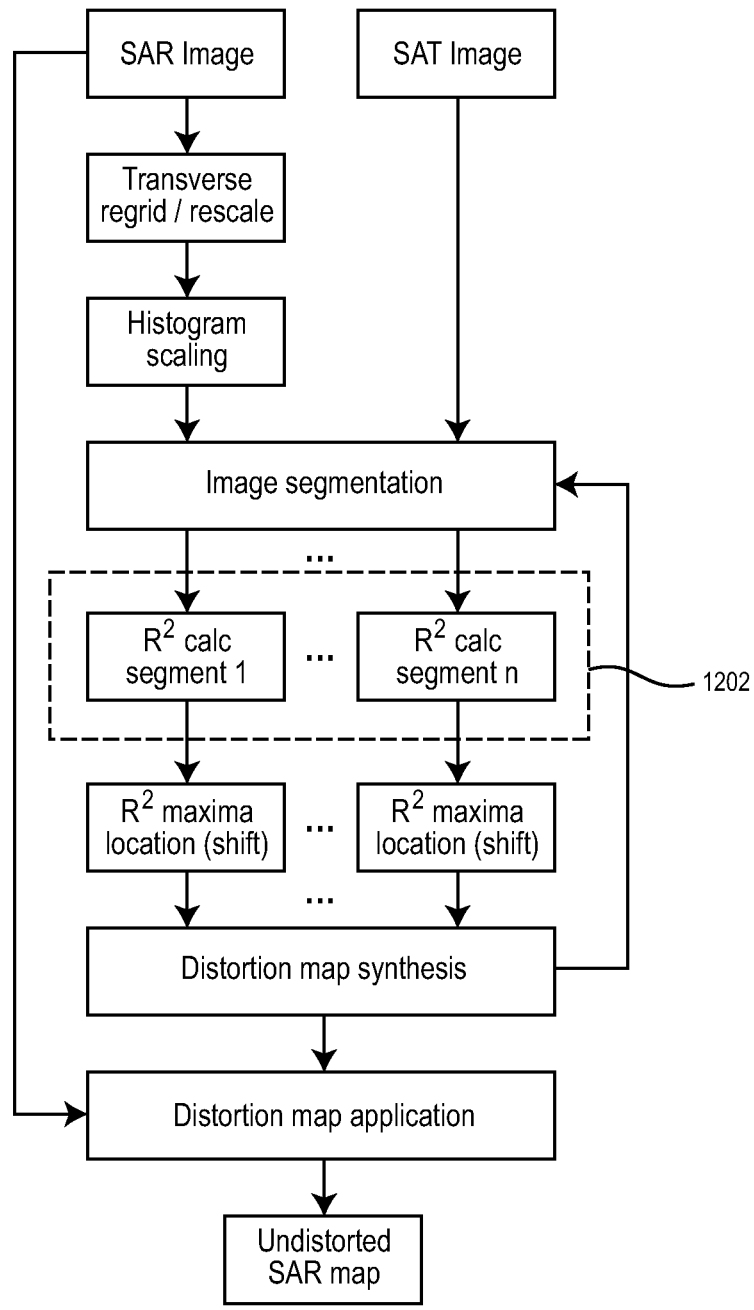
FIG. 12 is a flow diagram showing a process of computational flow for target and reference mapping according to an exemplary embodiment.

Eq 2 involves a number of discrete convolutions which can be accomplished using fast Fourier transforms (FFT's). At any given stage in the calculation (determined by the confidence in estimated offsets sx, sy and the corresponding size of subregion), this portion of the computation can be parallelized in one embodiment. In FIG. 12, the FFT's required (in dashed box 1202) could be done on multiple dedicated processors (usually Field Programmable Gate Arrays (FPGA) on PCI card) in one embodiment. Box 1202 can handle the most computational intensive portions. Alternatively, a fast implementation can be performed on a single pc computing platform. FIG. 12 shows computational flow for target and reference image mapping. The method of FIG. 12 can remove transient targets and moderate glints over moderately overlapped areas. Multiple two dimensional convolutions per segment can be performed. Transient targets can be replaced at remapped positions and layover corrections can be made.

Figure 13:
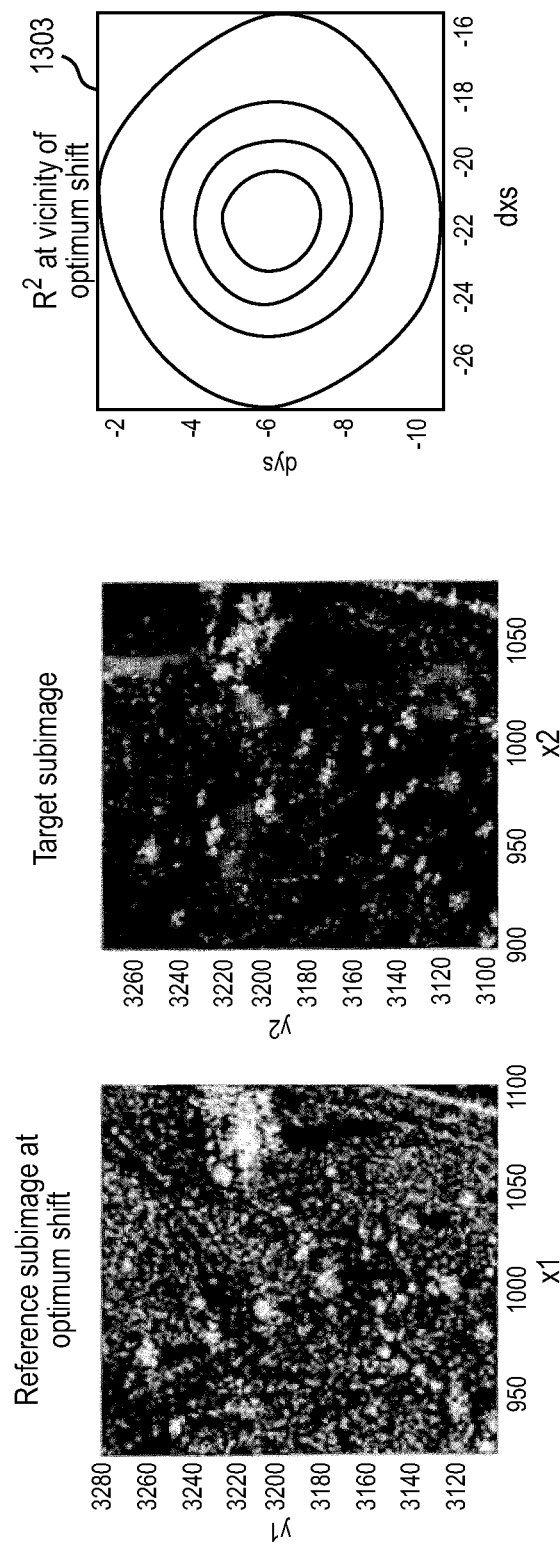
FIG. 13 is a drawing of a referenced subimage at optimum shift, a target subimage and $R^2$ in vicinity of optimum shift.

After determining R^2 as a function of shift (dx, dy) (FIG. 13, panel 1303), the pixel where the maximum value of R^2 occurs can be determined. This is nominally the best shift in one embodiment but better results can be achieved by fitting the R^2 value on the 3×3 array of pixels centered on the peak pixel to a low order 2-d polynomial and then determining the maximum of this function in one embodiment. In most cases, this results in refined locations for (dxs, dys) accurate at the 10-100 millipixel level without having to regrid the results to a finer mesh. This ability to correlate at the sub pixel level ultimately leads to location errors relative to the reference grid of 1/10-1/2 pixel which for 25 cm pixels translates to 2.5-12.5 cm accuracies. In addition to the refined maxima location and R^2 value, the principal curvatures and curvature directions of the R^2 surface at the maxima are also saved for the next step.

FIG. 8 shows reference subregion image 802 and target subregion image 804 before alignment. FIG. 9 shows these same images after alignment (e.g., image 902 and target subregion image 904 in one embodiment). Target subregion image 904 (FIG. 9) has been shifted the amount indicated by vector 906 on its right in one embodiment.

This step may involve looping back to step 303 to determine new subregions based on the shifts determined up to that point in the calculation.

At the end of step 304, a list of subregion offsets or distortions (FIG. 7B) are determined. The list of subregion offsets and distortions can be represented graphically as in FIG. 7C.

Compute Distortion Map

At a step 305, all of previously determined distortions are gathered and synthesized into a distortion map (e.g., in a computer system). Initially this amounts assigning a weight, w, to each subregion offset (dxs, dys). Weights could be based on peak R^2 values. More significantly, whatever R^2 based weighting are chosen, a different weight for the projection of (dxs, dys) in the each of the 2 directions of principal curvature can exist. A typical weighting function using the curvature principal C (units of 1/pixels) is:

$$w \sim -C^*(1+C)|0 \text{ for } -C<1|-C>=1 \quad \text{(eq 3)}$$

which produces a non-negative weight since C is always non-positive at a maximum point. If a section of straight highway or railroad runs through our sub image, this formula minimizes the contribution of directions where there is little discrimination (parallel to the highway) and maximizes those in the directions of higher discrimination (perpendicular to the highway).

Another method for assessing quality is to compute further subregion offsets for additionally defined subregions that are displaced from a given subregion by amounts typically in the range of 1 or 2 pixels. These substantially overlapping regions should have substantially the same computed offset. The variance, $\sigma^2$, of this offset from the mean is then a metric for the weight (something like $w \sim 1/(\sigma^2+b)$).

So far, offsets and corresponding confidences (expressed as weights) at a number of discrete points in the intersection have been computed. For the subsequent remapping step, this map is extended to cover all points. A number of approaches are applicable. Simplest is a linear fit such as that in eq 1 with the residuals interpolated from their Delaunay triangulation in one embodiment. For points outside the Delaunay mesh, only the linear fit is used. Similarly, instead of a linear fit a higher order polynomial fit could be used in combination with a Delaunay mesh. Another approach directly uses an over determined, 2-dimensional, polynomial fit to the data in one embodiment. As an additional exemplary refinement, points which are more than k (typically ~3) standard deviations away from the fit are discarded (weights set to 0) and the process repeated (possibly more than twice) in one embodiment. A further refinement fits to successively higher order polynomials until there is no longer significant reduction in the variance of the residuals in one embodiment.

In fitting to SAR data in regions with significant orography, layover effects can be considered. Layover effects are generally not removed as part of step 301 in one embodiment. In deeply undulating terrain, the effect of layover error could show up as rapidly changing offsets as a function of position that are not well modeled by a low order polynomial. If a reference image atlas can also provide simple orographic data such as the standard deviation, or 95th percentile largest land slope within the reference image, then from the data acquisition geometry that accompanies SAR imagery (block 301) the rapidity of changes in subregion distortions due to the layover effect can be estimated. With such an estimate, a determination of whether this aspect of the layover effect is negligible or whether the degree of fitting needs to be increased can be made in one embodiment. Note that in the process of correction, automatic removal of orographic layover effects can be achieved in one embodiment.

Remap Target Region

Having determined what distortion or error exists in the target image. Step 306, the target image can be remapped by shifting target pixels in the original image according to the determined distortion and appropriately interpolating. More directly through, any targets to be engaged can at this point be identified by a human (or possibly automatically), designated for attack, and the remapped position transmitted to the appropriate fire control authority.

Other Embodiments

Method 100 can be modified. In an alternative embodiment, method 100 can follow the same steps as shown in FIG. 3, except that between steps 301 and 302, a human (or possibly a machine) identifies and designates targets within the target image. Typically, this is implemented as a user layer overlaying the target image where target objects are outlined and aim points designated. At this point user would also designate whether a target was transient or not. After user designation, the transient target objects are removed from the scene by the processor and the subsequent sub image correlations are done without using these regions. This is readily accomplished by a simple generalization of eq 2 to handle whether a pixel is on or off in one embodiment. The purpose of removing transient targets is to prevent their layover effects from influencing the final distortion map. The removed targets are placed back in the target image at step 306.

Under normal circumstances, global position systems (GPS) have accuracies in the range of a few cm (sophisticated land surveying systems using maximum # of satellites) to 20 m (ref 2). Targeting of GPS weapons can be greatly improved by employing method 100. In one embodiment, if the platform (UAV SAR, for example) en route to a targeting region images one or several friendly firing stations (e.g., missile batteries) or acquires an image of the firing station, then by correlating the resulting SAR image with a satellite optical image, the precise launching locations of said missile batteries are determined. This information is saved either on the platform and/or transmitted to firing control and used to correct any errors in initial launch position of GPS or inertially guided munitions.

Figure 14:
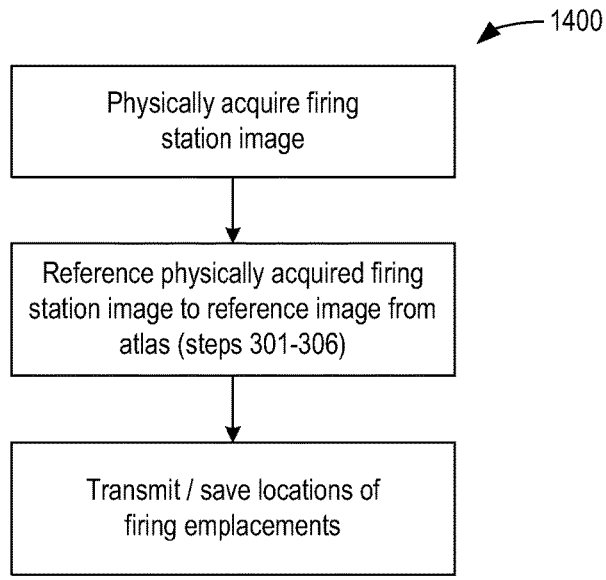
FIG. 14 is a flow diagram showing a firing station survey method in accordance with another exemplary embodiment.
Figure 15:
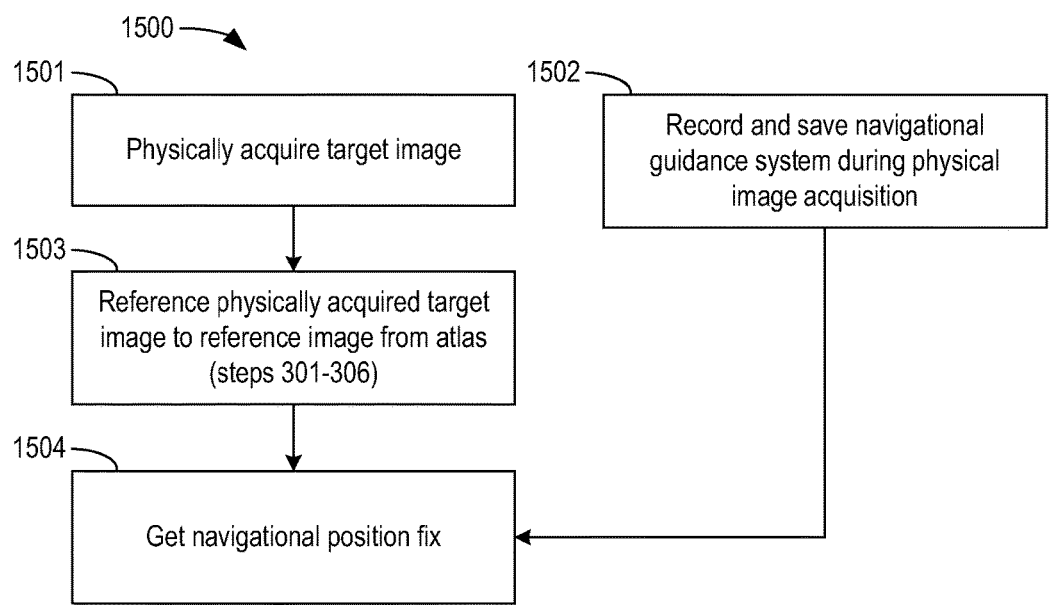
FIG. 15 is a flow diagram of a method of updating a platform position in accordance with another exemplary embodiment.

With reference to FIG. 14, a method 1400 surveys a firing station. The GPS accuracy at the target can be improved by noting the offset in the target's GPS position from its actual position as determined by method 1400. Referring to FIG. 15, a location method 1500 is shown. In method 1500, the aerial platform physically acquires the target image at step 1501 but at the same time (or rather throughout the image acquisition time period) records and saves the platform navigational, telemetry and other flight information including the GPS positions and positions as determined by the inertial guidance system at step 1502 in accordance with one embodiment. After the target image has been properly mapped to the reference image at step 1503 (using method 100 in one embodiment), the navigational and guidance system data is utilized in combination with the remapped target image to determine the platform position during the time span the target image was physically acquired at step 1504. This navigational position fix allows us to update the future platform location and also determine the target's true location according to GPS (i.e., we can send the target to the corrected GPS location). This valuable information once forwarded to fire control can be used to more accurately target present (already in flight) and future GPS guided munitions. Additionally, if the aerial platform is itself a munition (a cruise missile for example) utilizing terrain comparison (TERCOM) then optical images acquired en route to the target can be used with the method 100 to provide a navigational position fix thereby improving weapon accuracy. In this example, the aerial platform could serve as processor and repository for the image atlas (loaded prior to launch).

Figure 16:
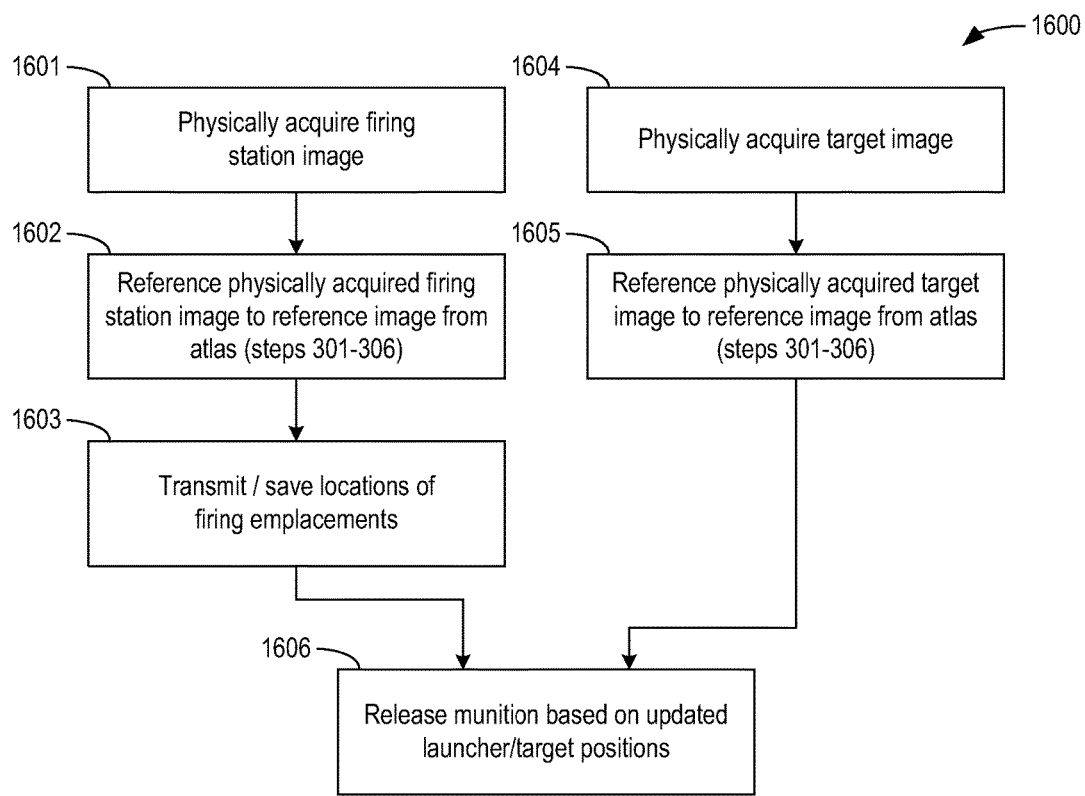
FIG. 16 is a method of direct munition targeting using a double look technique in accordance with yet another exemplary embodiment.
Figure 17:
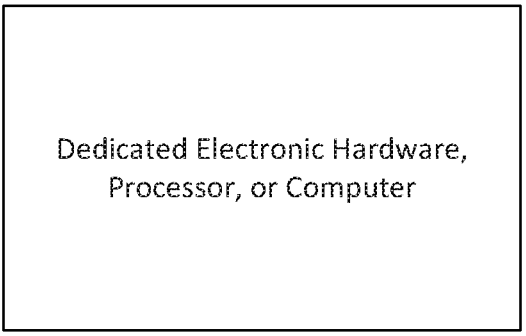
FIG. 17 is an illustration of dedicated electronic hardware, a processor, or computer configured to implement the concepts disclosed herein according to an exemplary embodiment.

Against well matched adversaries, degradation of GPS capability is expected due to enemy anti-satellite activity and jamming/deception measures. With ineffective or unknown GPS disposition, accurate targeting of autonomous munition systems (especially inertial guidance controlled) becomes paramount. Under these circumstances, the double look method 1600 of FIG. 16 can be advantageous. A UAV platform in transit physically acquires images of firing stations at step 1601 and using method 100 of FIG. 3A, determines the precise locations of firing emplacements within those firing stations. All this information is saved and/or relayed to the central fire control authority (FIG. 16, steps 1601:1603). At a later time (and possibly with a different UAV), target images are physically acquired and correlated with reference images providing accurate target locations (FIG. 16, steps 1604, 1605). This information is relayed to fire control and based on the precise locations of launchers and targets, munitions can be released with minimal targeting errors. By minimizing targeting error, the proposed scheme effectively extends the range of inertially guided munitions whose R95 is dominated by guidance system drift error (~time of flight ~range). Some movement in position of firing emplacements is expected between the time of their being precisely located and launch time, but these moves are either recorded using localized inertial guidance or GPS and the noted change in position is used to update the precise position of step 1603. Munitions are released based upon updated positions in step 1106.

Either the reference image, the target image, or both could be from satellite based SAR systems (resolution permitting). Furthermore, the reference image could consist of several discrete images that are stitched together upon use.

A satellite or other high altitude (stratospheric) platform could also acquire target images containing moving targets (cruise missiles, aircraft, helicopters) in one embodiment. These would typically be optical or infrared images. Using method 100 of FIG. 3, a precise fix on the target locations can be achieved.

Rectangular pixels can be used instead of square pixels in one embodiment. In another embodiment, the reference image can be stitched together. Reference image can be reduced to range×range coordinates.

The calculations discussed herein can be implemented on dedicated electronic hardware, a processor or computer.

In an alternative embodiment, instead of acting directly on the target coordinates transmitted to fire control, fire control can add an additional offset to account for known errors in the reference image atlas. If the reference atlas is commercial satellite imagery (unclassified & widely available), it may not provide sufficient targeting accuracy for the intended munition/target combination. In that case, a second conversion table that corrects for known errors in the reference image atlas would supply the necessary correction. This partitioning of accuracy may be necessary to efficiently meet mandated information security protocols It is understood that while the detailed drawings, specific examples, equations, steps, and particular values given provide exemplary embodiments of the present invention, the exemplary embodiments are for the purpose of illustration only. The method and apparatus of the invention is not limited to the precise details and conditions disclosed. For example, although specific types of images and mathematical operations are mentioned, other image data and algorithms can be utilized. Various changes may be made to the details disclosed without departing from the spirit of the invention which is defined by the following claim.

What is claimed is:

1. A system for mapping a target region image to a reference image, the system comprising:
   at least one of dedicated electronic hardware and one or more dedicated processors, the at least one dedicated electronic hardware and one or more dedicated processors configured to:
      determine offsets between a number of common subregions in an intersection of a reference image and a target region image;
      compute a distortion map of the target region image over the intersection; and
      generate a remapped target region image by remapping the target region image to match the reference image.

2. The system of claim 1, where the at least one of dedicated electronic hardware and one or more dedicated processors is further configured to transmit the generated remapped target region image to a system configured to at least one of monitor or control movement of an aerial platform using the generated remapped target region image.

3. The system of claim 1, wherein the target region image is a SAR image and the region target image is optical image, an infrared image, or a millimeter wave image.

4. The system of claim 1, wherein the reference image is a SAR image, an optical image, an infrared image, or a millimeter wave image.

5. The system of claim 1, wherein the reference image has a known geolocation accuracy.

6. The system of claim 1, wherein the common subregions are adaptively determined depending on a shape of the intersection.

7. The system of claim 1, wherein the common subregions are weighted according to a quality of the offsets.

8. The system of claim 1, wherein the common subregions are adaptively determined dependent on a shape of the intersection and a quality of the determined offsets.

9. The system of claim 1, wherein at least one of a grid or scaling of the target region image is modified before determining a number of subgroups to match the scaling and grid of the reference image.

10. The system of claim 1, wherein the at least one of dedicated electronic hardware and one or more dedicated processors is further configured to designate and remove transient targets from the target region image before determining the offsets between the common subregions.

11. The system of claim 1, wherein the at least one of dedicated electronic hardware and one or more dedicated processors is further configured to scale an image pixel histogram of the target region image, the reference image, or both the target region image and the reference image.

12. The system of claim 1, wherein computations for determining the offsets are carried out using parallel processing.

13. The system of claim 1, wherein the distortion map is overdetermined and weights the offsets.

14. The system of claim 1, wherein the at least one of dedicated electronic hardware and one or more dedicated processors is further configured to replace the transient targets at newly determined locations.

15. The system of claim 1, wherein the at least one of dedicated electronic hardware and one or more dedicated processors is further configured to remove an SAR layover error from replaced targets.

16. The system of claim 1, wherein the at least one of dedicated electronic hardware and one or more dedicated processors is further configured to remove known geometric distortions from the target region image, the reference image, or both the target region image and the reference image.

17. A method for improving targeting accuracy of a GPS guided munition, the method comprising:
   locating firing emplacement locations in a firing station image using a remapped image;
   acquiring GPS locations of the firing emplacements; and
   generating corrected targeting data based on a difference from the firing emplacement locations and the GPS locations of the firing emplacements.

18. The method of claim 17, further comprising at least one of:
   controlling movement of the GPS guided munition using the corrected targeting data; or
   transmitting the corrected targeting data to a system configured to control the movement of the GPS guided munition using the corrected targeting data.

19. A method of improving a navigational position fix for an aerial platform, the method comprising:
   recording a GPS signal locating a ground image using a remapped image;
   locating the aerial platform using the ground image;
   generating corrected navigational data by correcting in situ navigational data of the aerial platform using information gained in location; and
   transmitting the corrected navigational data.

20. A method for precisely targeting a munition, comprising:
   locating firing emplacement locations based on a firing station image using a remapped image technique;
   locating targets within a target image using the remapped image technique;
   transmitting the firing emplacement locations and target locations to fire control; and
   releasing munitions utilizing the firing emplacement locations and the target locations.

* * * * *